United States Patent [19]
Richardson, Jr.

[11] Patent Number: 6,153,058
[45] Date of Patent: Nov. 28, 2000

[54] PRODUCTION MEANS FOR FUEL GAS APPARATUS

[76] Inventor: William H. Richardson, Jr., 3035 Hickory Dr., Largo, Fla. 33770

[21] Appl. No.: 08/451,459

[22] Filed: May 26, 1995

Related U.S. Application Data

[60] Division of application No. 07/854,938, Mar. 20, 1992, abandoned, which is a continuation-in-part of application No. 07/613,094, Nov. 15, 1990, abandoned.

[51] Int. Cl.$^7$ .................................................. F02B 43/08
[52] U.S. Cl. ....................... 204/164; 204/225; 204/278; 204/294; 123/3
[58] Field of Search .................................... 204/164, 225, 204/278, 294; 123/3

[56] References Cited

U.S. PATENT DOCUMENTS

| | | | |
|---|---|---|---|
| 603,058 | 4/1898 | Eldridge et al. | 204/164 |
| 1,795,670 | 3/1931 | Odell et al. | 123/3 |

*Primary Examiner*—Arun S. Phasge

[57] ABSTRACT

Water-derived fuel gas. An underwater carbon arc operated in the absence of hydrocarbons results in a mixture of gases, being non-self-combustible but combustible as a fuel gas in the presence of air, and comprising gaseous hydrogen in major amount and carbon oxides in minor amount, predominantly carbon monoxide. The fuel gas is adapted along with air to run an internal combustion engine, and along with oxygen to operate a cutting or welding torch.

13 Claims, 3 Drawing Sheets

PRODUCTION MEANS FOR FUEL GAS APPARATUS

This application is a division of application Ser. No. 07/854,938 filed Mar. 20, 1992, which was a continuation-in-part of then co-pending which was a continuation-in-part of my patent application, Ser. No. 613,094 filed Nov. 15, 1990, now abandoned.

TECHNICAL FIELD

This invention relates to water-derived gases, especially a fuel gas mixture resulting from underwater electrical carbon arcing.

BACKGROUND OF THE INVENTION

Underwater electrical arcing is known to be conducive to production of hydrogen gas, as disclosed in U.S. patents to Eldridge et al. 603,058 and Carr et al. U.S. Pat. No. 4,233,132. Both of them are interested almost exclusively in collection of hydrogen gas—and undertake to see that other components are absent, reacted, or otherwise removed.

SUMMARY OF THE INVENTION

A primary object of the present invention is to derive from underwater electrical carbon arcing a non-self-combustible gas mixture combustible in the presence of air.

Another object of this invention is to produce in that manner a fuel gas rich in gaseous hydrogen and carbon monoxide.

A further object of the invention is to run internal combustion engines on such fuel gas.

Yet another object is to use such a fuel gas in welding metals.

A still further object is to achieve the aforementioned objects in economical fashion.

In general the objects of the present invention are attained by collecting gases evolved from underwater carbon arcing.

More particularly, the objects of this invention are embodied in a fuel gas rich in gaseous hydrogen and carbon monoxide, and low in content of gaseous oxygen and carbon dioxide.

Other objects of the present invention, together with means and methods for attaining the various objects, will become apparent from the following description and the accompanying diagrams of preferred embodiments presented here by way of example rather than limitation.

DESCRIPTION OF THE INVENTION

Figure 1:
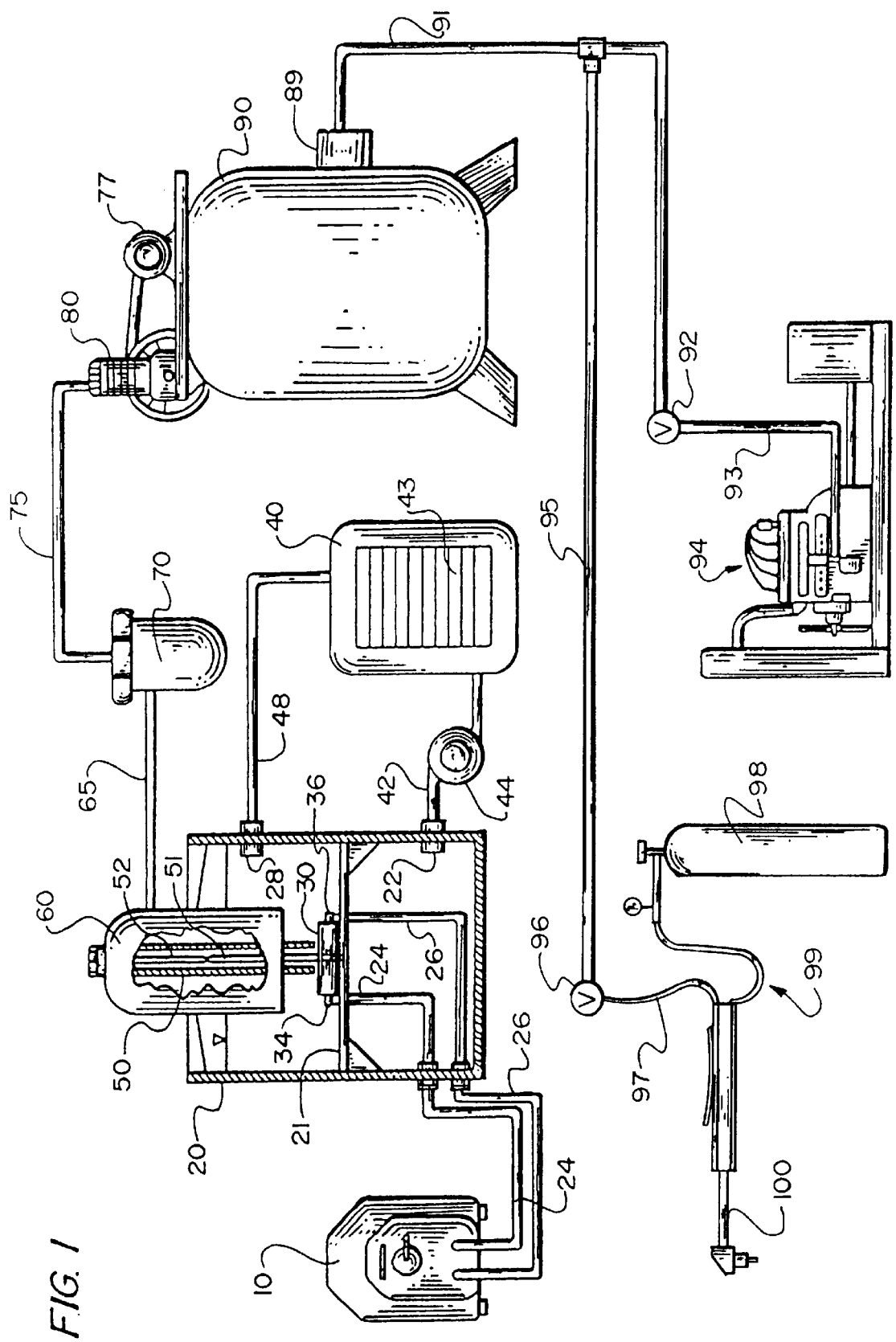
FIG. 1 is a schematized elevation of apparatus adapted to make, and apparatus to use, the fuel gas of this invention.

FIG. 1 shows in schematic elevation apparatus for evolving and collecting a mixture of gases as the fuel gas of this invention. At the left is welder 10 as an exemplified high-current power supply. Pair of electrical leads 24, 26 go to and through reactor wall 20 and connect at terminals 34, 36 across block electrode assembly 30 (detailed in FIG. 2) supported on horizontal partition 21.

Reactor 20 contains water (dashes) to a high level (triangle) covering not only the electrode assembly but outlet 22 near the bottom to water line 42 containing filter/pump 44 and leading to heat exchanger 40 hidden by louvers 42 and on to inlet 48 (near top) at the end of return line 48 from the heat exchanger. Rod magazine 50 and concentric gas collection hood 60 enter the reactor from the top and terminate under water above block electrode assembly 30. First and second rods 51 and 52, aligned upright within the magazine, are centered above the electrode assembly, with the bottom end of the first rod bridging the narrow edges of the respective electrodes (shown later) and with the top end of the first electrode touching the bottom end of the second electrode.

Gas takeoff line 65 connects the interior of hood 60 to filter 70, from which gas collection line 75 connects to compressor 80 on top of, and communicating with, storage tank 90. Tank outlet valve 89 has fuel supply line 91 connecting the tank through valve 92 to fuel line 93 of internal combustion engine assembly 94. Connecting further fuel supply line 95 connects through valve 96 to fuel line 97 of torch 100 to which line 99 connects from oxygen tank 98.

Figure 2:
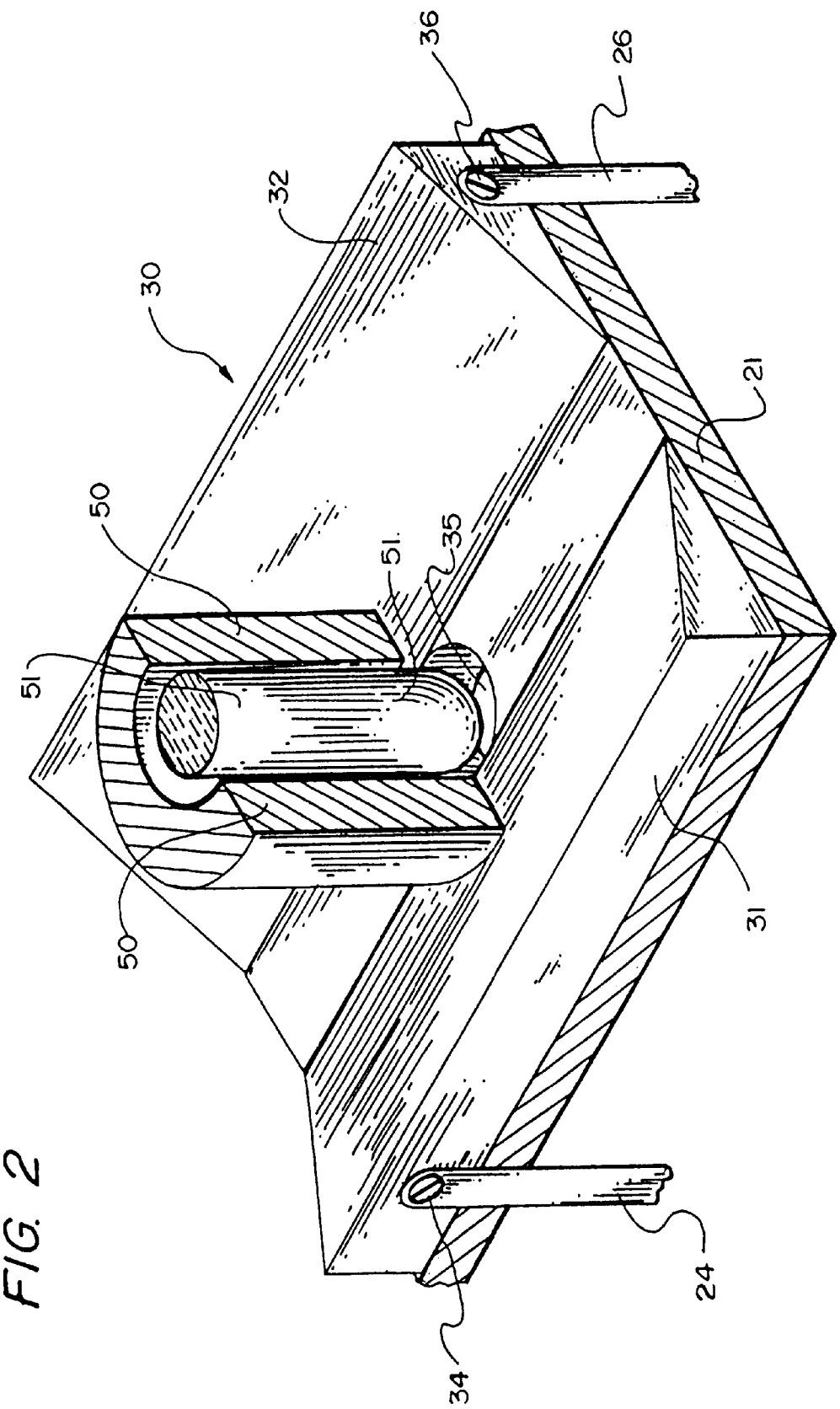
FIG. 2 is a fragmentary perspective view, on an enlarged scale, of arcing elements, and vicinity, of the same apparatus.

FIG. 2 shows fragmentarily, in perspective, block electrode assembly 30 on partition 21 of the reactor (as in FIG. 1 but larger). Central opening 35 in the compartment is as wide as the spacing between the narrow edges of respective wedge-shaped electrodes 31, 32. The rounded lower end of rod 51 is nearing the opening within which it will rest as the arc is struck across the electrodes and through it when power is applied across the electrodes at terminals 34, 36. Water is omitted as unnecessary to an understanding of this view, but it will be understood that an arc between the electrodes through the rod heats the water so greatly as to break the water down into constituent gases and also to produce gases containing carbon. The next two views will aid understanding of the ensuing procedure.

Figures 3, 4:
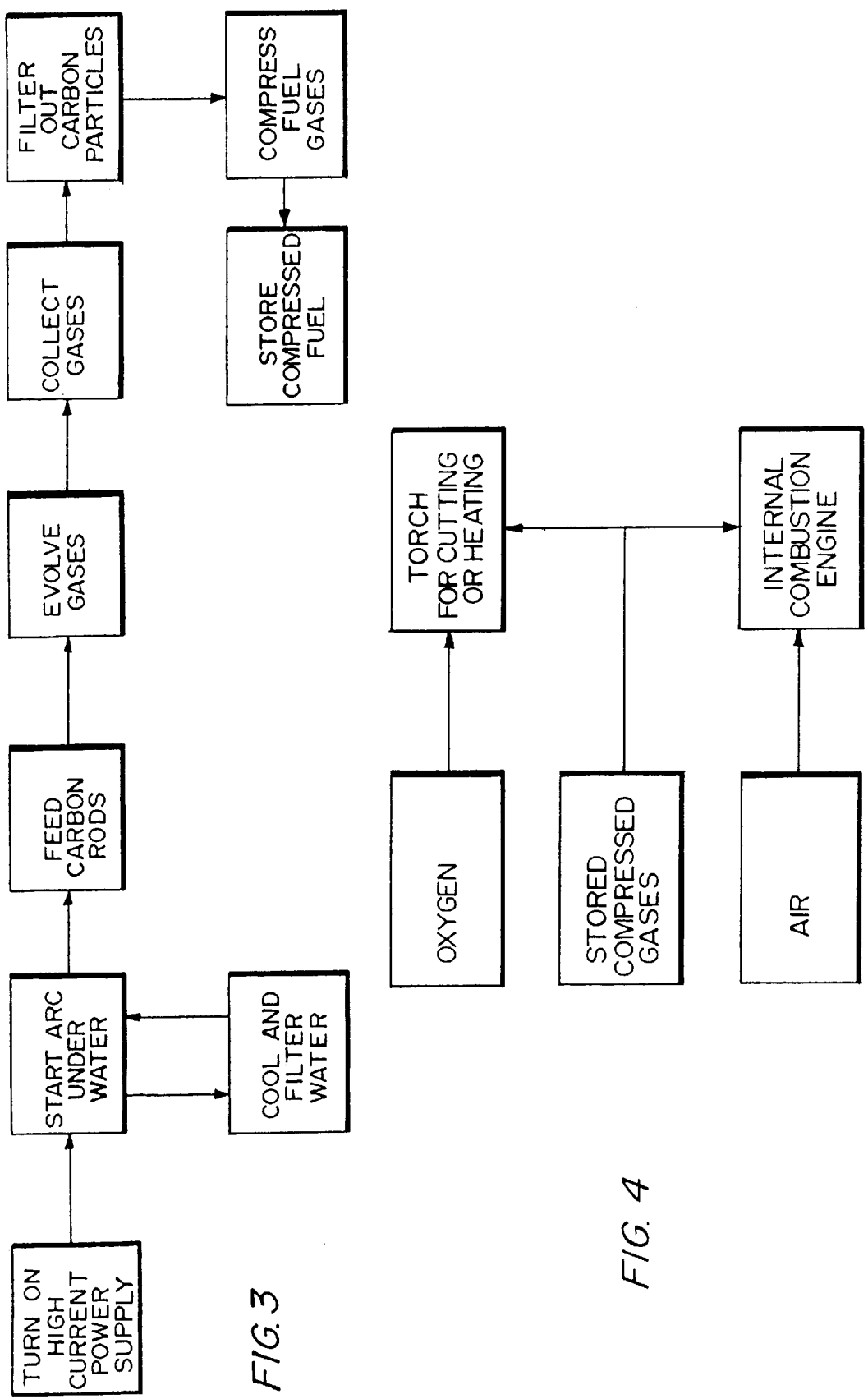
FIG. 3 is a schematic block diagram of the gaseous fuel mixture of this invention.
FIG. 4 is a schematic block diagram of utilization of the fuel gas of this invention.

FIG. 3 shows, in block form, a flow diagram of steps that take place in the practice of this invention. Sequential steps include Turn On High Current Power Supply, Start Arc Under Water, Feed Carbon Rods, Evolve Gases, Collect Gases, Filter Carbon Particles, Compress Gases, and Store Compressed Gases. The last mentioned step is performed upon an evolved, partly reacted, mixture of constituent and by-product gases, useful as a fuel gas. Cool And Filter Water is a cyclical accessory step useful in maintaining water conditions as desired, especially at the locus of gas evolution—from which the evolved gases bubble up through the intervening water and into the overlying hood, to be drawn off and stored for use.

FIG. 4 shows, in similar block form, examples of subsequent usage of the gaseous mixture evolved and collected (as in FIG. 3). Stored Compressed Gases go as a fuel gas to a Torch for Cutting or Heating, also supplied with oxygen, and/or to an Internal Combustion Engine, also supplied with Air. These exemplified uses may be augmented in kind or in number in accordance with demand and supply.

How to practice this invention is readily apparent from FIGS. 1 to 4 and the foregoing description. Underwater arcing occurs when an electrical potential (either A.C. or D.C.) such as used in steel welding is applied across the block electrodes, which preferably are composed essentially of graphite—provided that a conductive rod (preferably also carbon) substantially bridges the gap between them.

The mixture of gases so evolved and collected according to the present invention contains (by volume) gaseous hydrogen in major amount, such as from about five to about seven tenths, and carbon monoxide in substantial minor amount, such as from about two to about three tenths. Also likely to be present as an end-product (here a by-product) is at most about a tenth to an eighth made up mainly of carbon dioxide and gaseous oxygen—the latter in an amount insufficient for the mixture of gases to be self-combustible (rarely more than several percent). Traces of methane and/or other organic gas may be present as well.

Carbon in the resultant gaseous mixture comes mainly from the rod used to bridge the block electrodes. The carbon dioxide content is held down by substantial absence of hydrocarbons, oils, or other organic chemicals, such as otherwise might combine with the oxygen released by water decomposition in the reactor. Resulting gaseous oxygen may be attributed to the water decomposition and/or to having been dissolved in the water.

A representative analysis of the fuel gas of this invention can be expected to show about five-eighths gaseous hydrogen, two eighths carbon monoxide, with the rest made up of the other mentioned gases.

The resulting fuel gas burns well upon access to air or oxygen in effective amount, with substantially clear flame and no sooting. As noted, it can fuel a cutting or welding torch along with oxygen, or an internal combustion engine along with air—without need for an atomizing carburetor or injection nozzle. Such an engine may be of jet, piston, turbine, or other type, as to power a vehicle, a pump, or an electrical generator, for example.

No unusual materials of construction are needed in apparatus of this invention. The reactor need be only a structurally sound tank, such as steel or other metal, and is preferably grounded. The hood to receive the evolved gases, and the magazine to hold and dispense the rods, are conveniently made of metal, plastic, or ceramic. The magazine may accommodate any convenient number of rods, conveniently loaded upright side-by-side on an inside surface slanting down to a exit directly above the desired electrode-bridging location so as to fed by gravity, although automatic feed may be adopted if preferred.

The rods themselves may be common welding rods, composed mainly of particulate carbon held together by a conventional binder. As also noted, the electrode blocks are solid graphite, also generally available for use in welding and other high-temperature environments and/or high-pressure environments requiring chemical inertness.

The water to be decomposed in the process of this invention is not subject to any unusual requirement, and most fresh water sources can be expected to prove satisfactory. The water should not contain petroleum products or other organic materials in appreciable concentration, as they might contaminate the resulting fuel gas with compounds not so clean burning—or otherwise result in a less desirable fuel gas.

The toxicity of carbon monoxide is tolerated in preference to conversion of carbon monoxide to carbon dioxide in the reactor—with reduction in fuel capability—because concentrated fuel materials of whatever sort pose health and safety hazards. Caution is essential in handling and using any fuel, so it is expected to be exercised in the instance of this fuel gas as well.

The combustion products of gaseous hydrogen and carbon monoxide are respectively simply water and carbon dioxide, so clean burning is an understandable characteristic of the resulting fuel gas, as is the preference for exclusion of organic materials generally. Other advantages include the fact that water is a relatively low-cost starting material. Similarly, the power required to decompose water is readily available at reasonable cost in at least most locations.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

What is claimed is:

1. Apparatus adapted to convert carbon and water into a fuel gas, comprising a reactor vessel partly filled with water to a given level, a pair of spaced underwater graphite block electrodes therein each having an electrical terminal and together being adapted to be provided with electrical potential difference thereacross sufficient to strike an underwater arc when conductive means is interposed, magazine means centered upright above the spaced electrodes and laterally surrounding a plurality of conductive rods and adapted to feed the rods one after another downward into interposed position, each rod being adapted in such interposed position to contact edges of the respective block electrodes and thereby enable an arc to be struck to decompose water into constituents in gaseous form and into by-product gases containing carbon, as a mixed fuel gas.

2. Apparatus according to claim 1, wherein the electrodes are wedge-shaped, each with an inclined face uppermost, and both with their respective thin edges spaced closest together.

3. Apparatus according to claim 1, including a storage tank, a gas collection line with an intake end above the water level in the reactor vessel and a discharge end connecting to the tank, and on/off fuel outlet means from the tank to a fuel supply line.

4. Apparatus according to claim 3, including means adapted to filter and compress the gas for temporary storage in the tank.

5. Apparatus according to claim 3, in combination with an internal combustion engine having a fuel intake with an air intake, wherein the fuel supply line is connected from the storage tank to the engine fuel intake, whereby the internal combustion engine is enabled to operate by burning the supplied mixed fuel gas with air.

6. Apparatus according to claim 3, in combination with a gas torch having a fuel intake as well as an oxygen intake, wherein the fuel supply line is connected from the storage tank to the torch fuel intake, whereby the torch is enabled to operate by burning the supplied mixed fuel gas with oxygen.

7. Apparatus adapted to convert carbon and decompose water into a fuel gas, comprising a pair of spaced underwater graphite block electrodes each having an electrical terminal and together being adapted to receive thereby from an external electrical source a potential difference thereacross sufficient to strike and maintain an underwater arc when conductive means is interposed therebetween, each electrode being wedge-shaped with inclined uppermost face, the electrodes having their respective thin edges spaced apart and thereby adapted to receive a conductive rod interposed therebetween.

8. Apparatus according to claim 7, including a reactor vessel adapted to hold water, admitting electrical leads from the external source to the terminals of the respective electrodes, and having therein partition means underlying and supporting the electrodes.

9. Apparatus according to claim 8, including hood means laterally surrounding the magazine means and adapted to collect gases from water decomposed in the apparatus.

10. Apparatus according to claim 7, including magazine means centered above the spaced electrodes, carrying a plurality of rods as conductive means, and adapted to feed rods one at a time downward into position interposed between the thin edges of the electrodes.

11. Fuel-gas production apparatus, comprising means defining a reactor at least partly filled with water, means providing a submerged underwater electric arc in the reactor, means providing carbon to the electric arc, whereby carbon and water are converted to fuel gas bubbling up through the water, and means for collecting, compressing, and storing the fuel gas, in combination with apparatus including an internal-combustion engine receiving fuel from the fuel-gas production apparatus.

12. The apparatus combination according to claim 11, wherein the internal-combustion engine is conventional and is able to run on a mix of air and the fuel from the fuel-gas production apparatus.

13. The apparatus combination according to claim 11, wherein the internal-combustion engine lacks an atomizing carburetor.

* * * * *